United States Patent [19]

Watanabe et al.

[11] 4,349,514

[45] * Sep. 14, 1982

[54] PROCESS FOR RECOVERY OF REUSABLE CHROMIC ACID FROM THE WASTE CHROMIC ACID SOLUTION CONTAINING IMPURITIES

[75] Inventors: Morio Watanabe, Amagasaki; Sanji Nishimura, Kyoto, both of Japan

[73] Assignee: Solex Research Corporation, Osaka, Japan

[ * ] Notice: The portion of the term of this patent subsequent to Mar. 13, 1996, has been disclaimed.

[21] Appl. No.: 66,167

[22] Filed: Aug. 13, 1979

Related U.S. Application Data

[63] Continuation of Ser. No. 932,321, Aug. 9, 1978, abandoned, which is a continuation of Ser. No. 786,770, Apr. 12, 1977, Pat. No. 4,144,145.

[30] Foreign Application Priority Data

| Apr. 15, 1976 | [JP] | Japan | 51-41808 |
| Jul. 29, 1976 | [JP] | Japan | 51-89674 |
| Nov. 27, 1976 | [JP] | Japan | 51-142499 |
| Dec. 6, 1976 | [JP] | Japan | 51-145688 |

[51] Int. Cl.³ .................... B01D 11/00; C01G 37/00; C01G 37/14
[52] U.S. Cl. ............................ 423/54; 204/DIG. 13; 210/634; 210/639; 210/913
[58] Field of Search ................. 204/DIG. 13; 423/54; 210/913, 634, 639

[56] References Cited

U.S. PATENT DOCUMENTS 3,857,919  12/1974  Hazen et al. .................... 423/54 X 3,875,285  4/1975  Nyman et al. ..................... 423/54

FOREIGN PATENT DOCUMENTS

| 698700 | 11/1964 | Canada | 423/54 |
| 733029 | 4/1966 | Canada | 423/54 |
| 51-90999 | 10/1976 | Japan | 423/54 |

OTHER PUBLICATIONS

A. A. Yadav et al., Indian J. of Chem., vol. 8, pp. 290-292, Mar. 1970.

*Primary Examiner*—G. L. Kaplan
*Attorney, Agent, or Firm*—Toren, McGeady & Stanger

[57] ABSTRACT

A process for recovery of reusable chromic acid from waste chromic acid solution containing impurities, which process comprises a first step in which the solution containing chromic acid is introduced into the cathode compartment in an electro-dialysis process and free chromic acid or chromate ions in the above solution are transferred to the anode compartment, a second step in which $H_2SO_4$ is added in at least equivalent amounts to the heavy metallic ion contained in the outlet solution, in which chromic acid ion concentration is reduced, in order to convert chemical species of the contained metallic ion and increase the $H^+$ ion concentration and then chromate ions in the resultant solution are extracted into an organic phase with contact of an organic solvent (A), and a third step in which residual amounts of chromic acid ion remaining in the aqueous raffinate from the second step are extracted into an organic phase with contact of an organic solvent (B). Organic solvents A and B are regenerated by stripping the organic phase with a suitable strip reagent.

10 Claims, 20 Drawing Figures

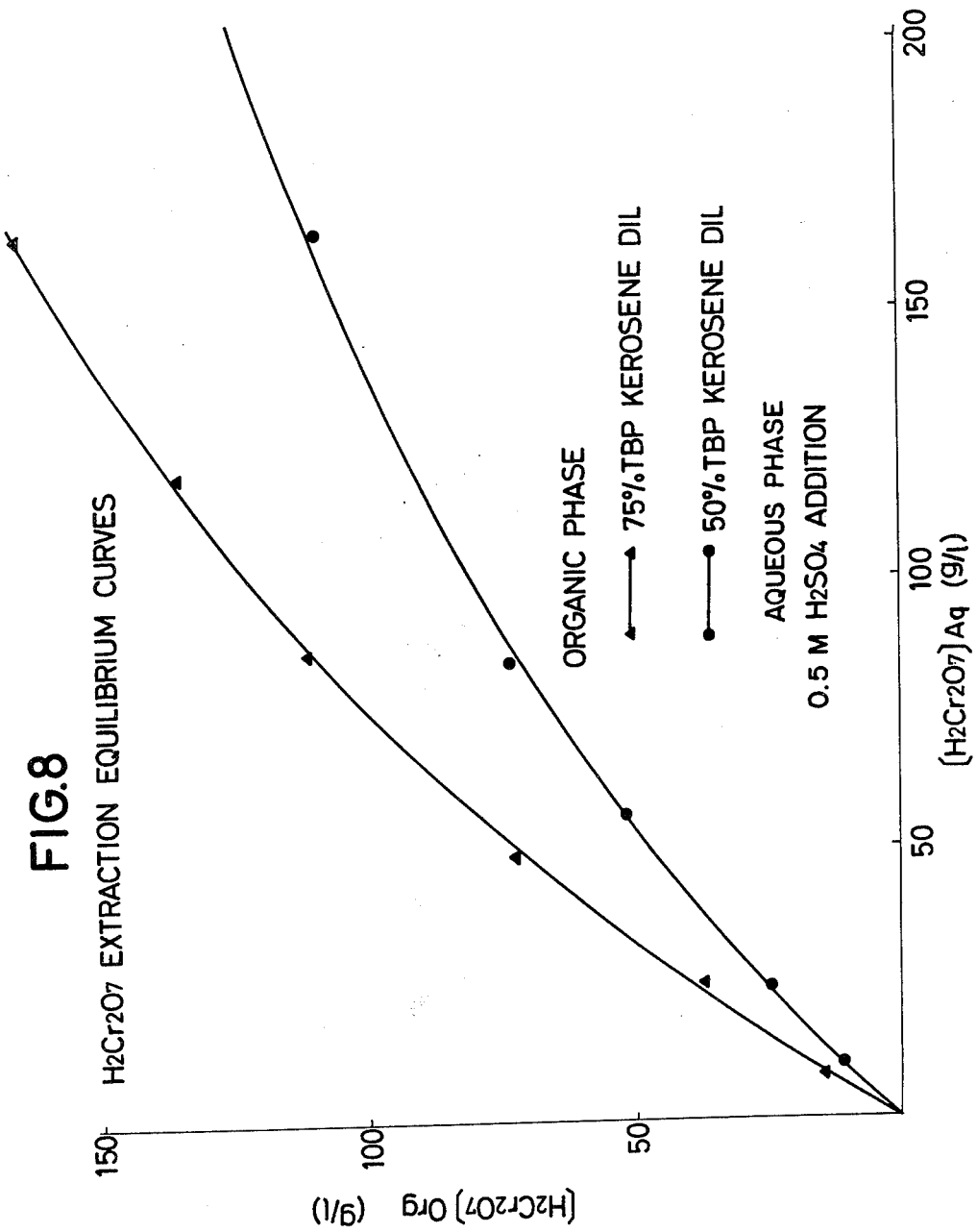

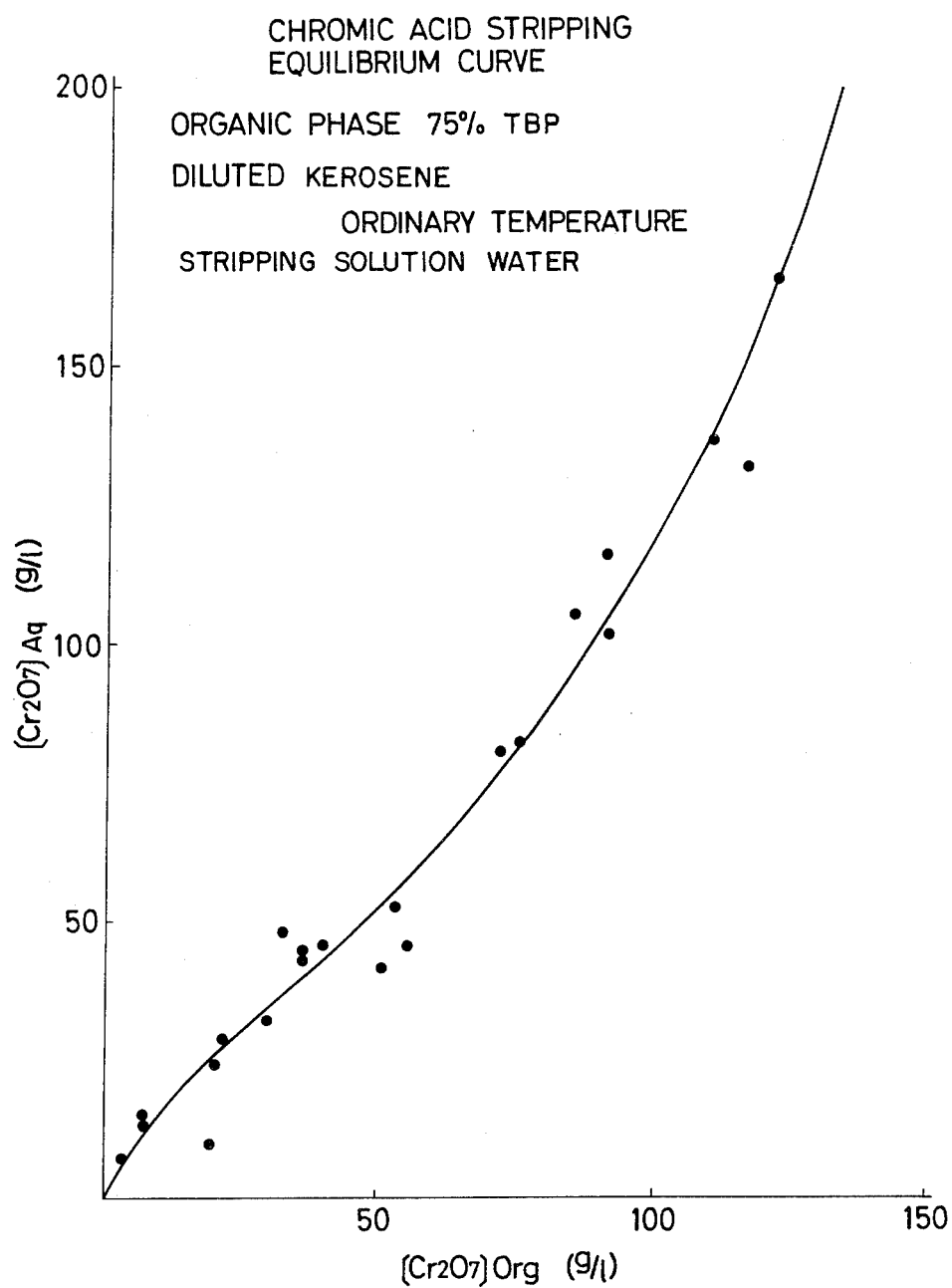

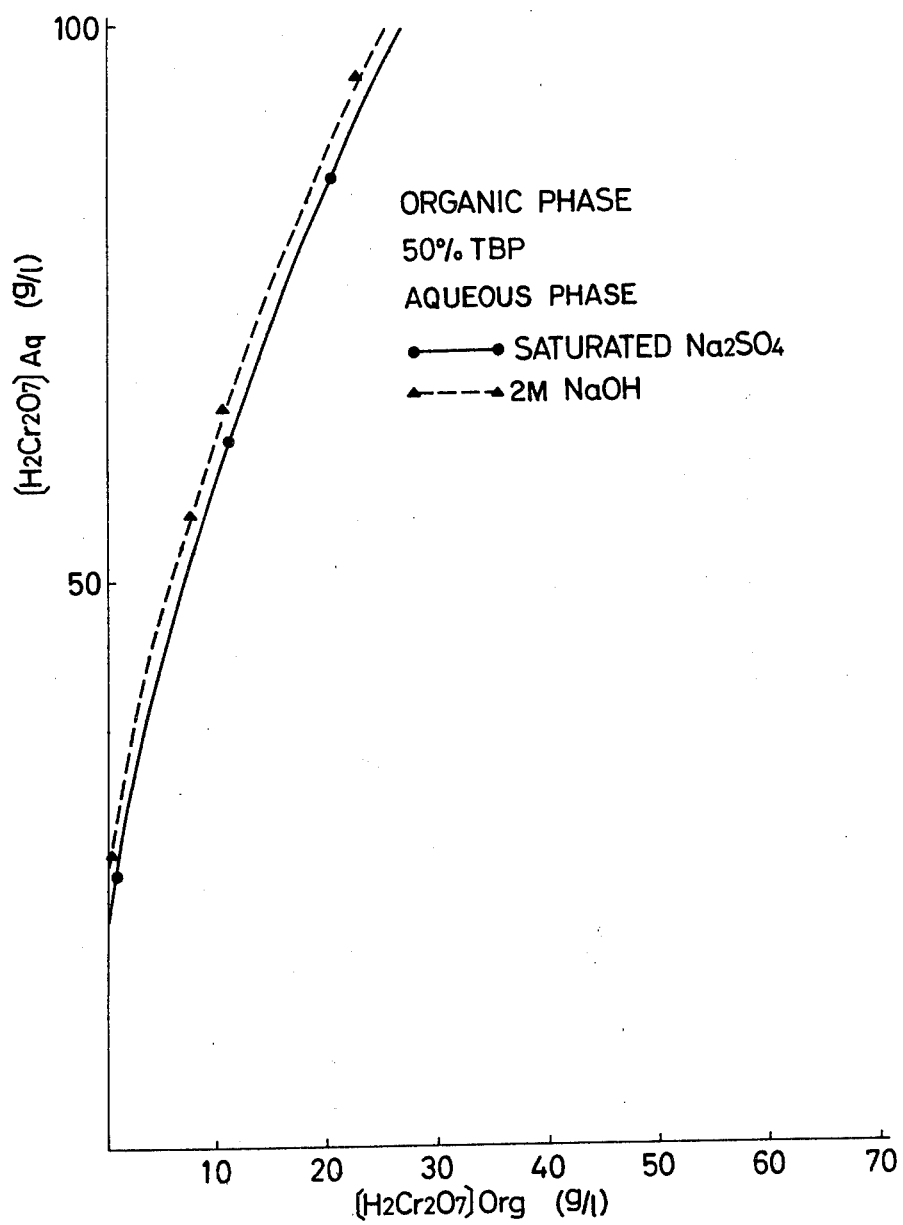

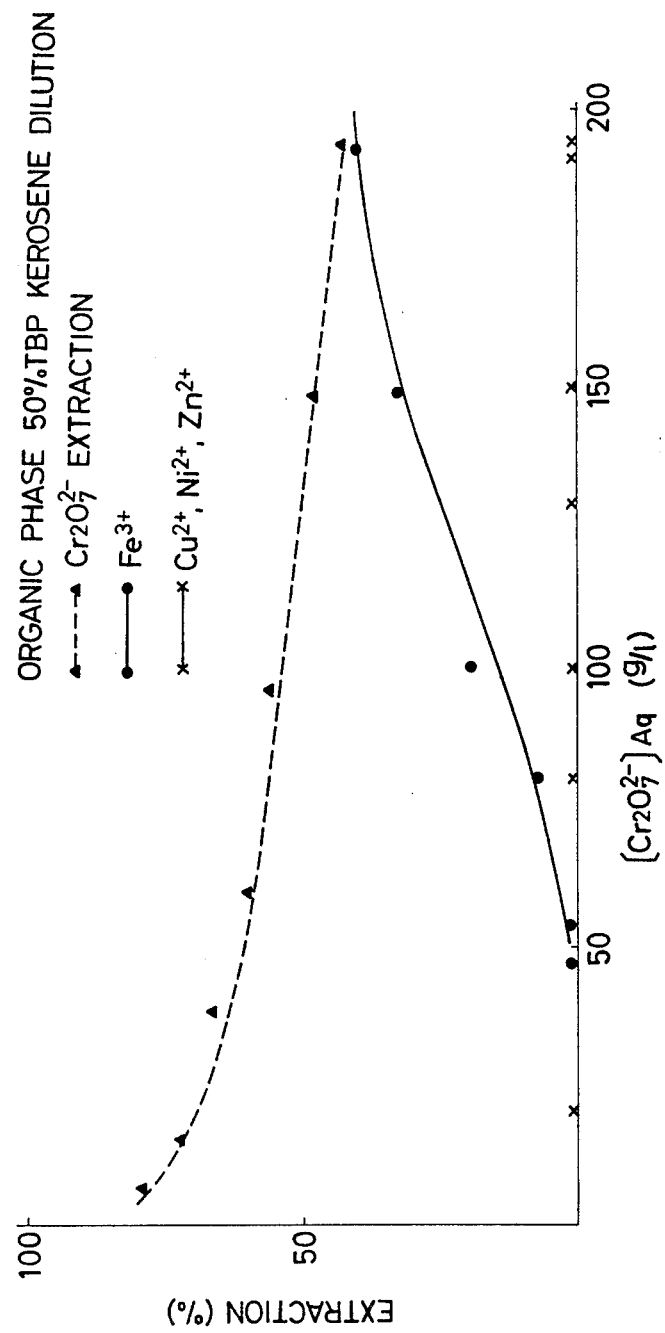

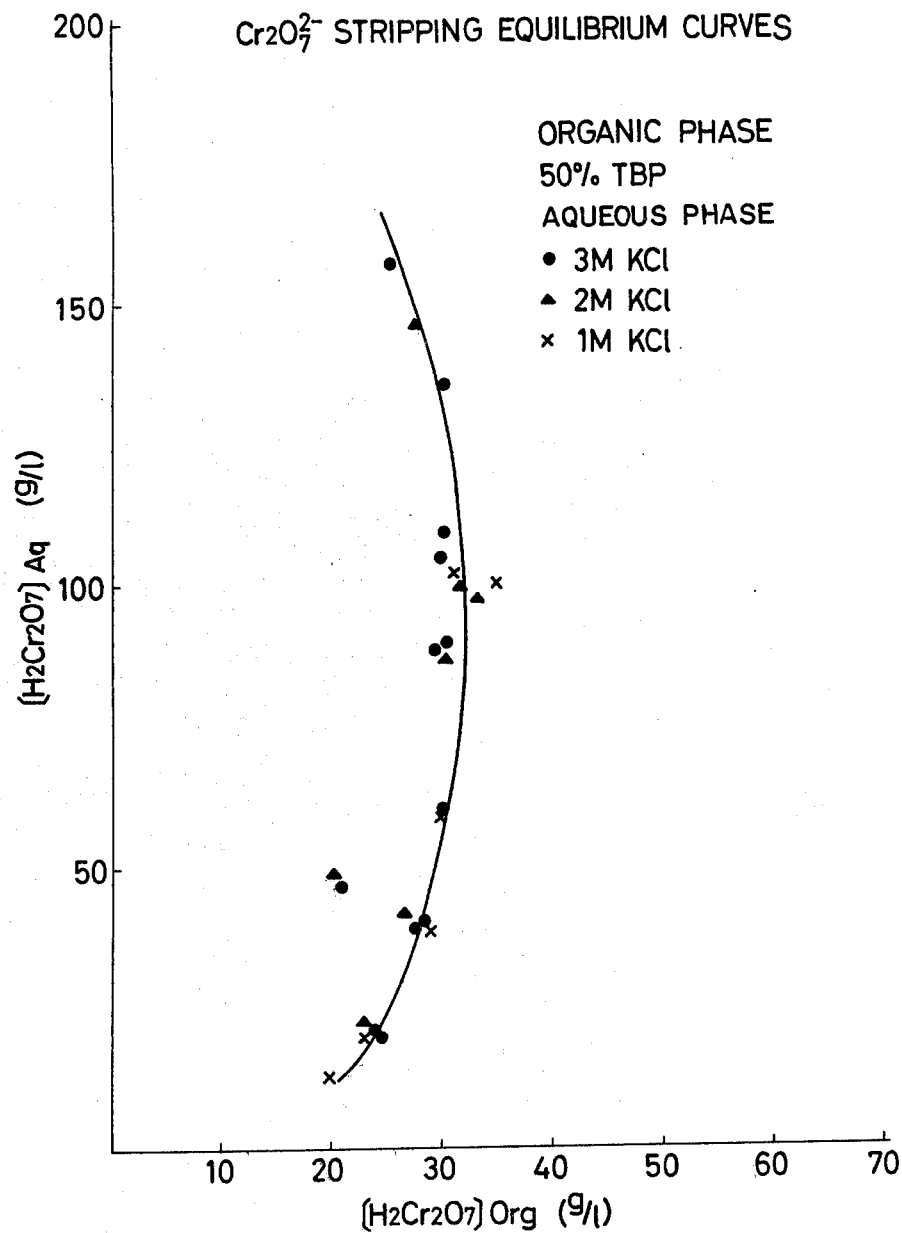

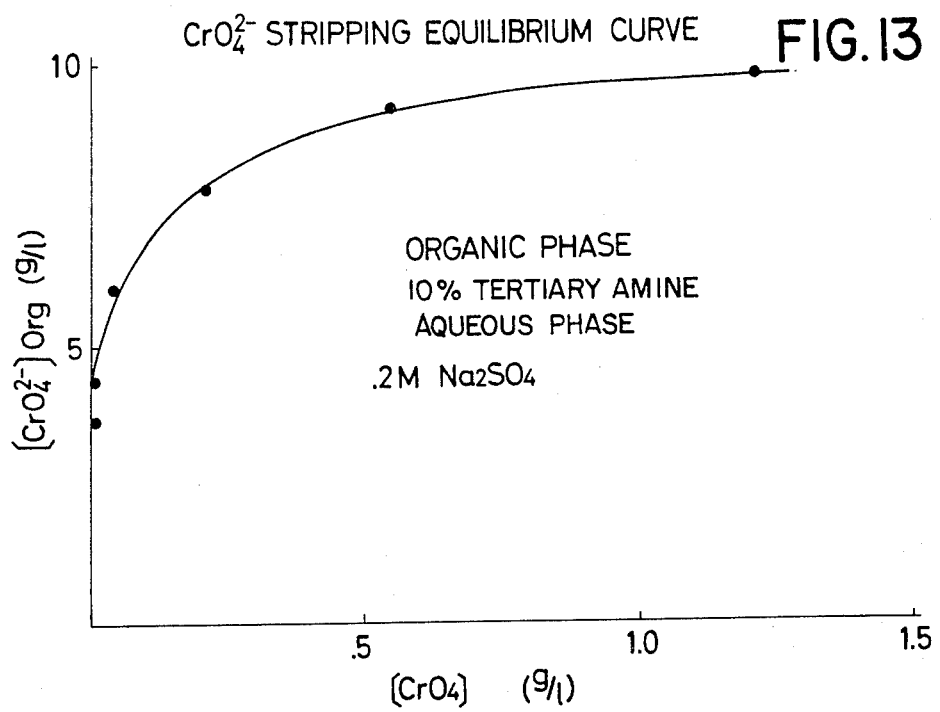
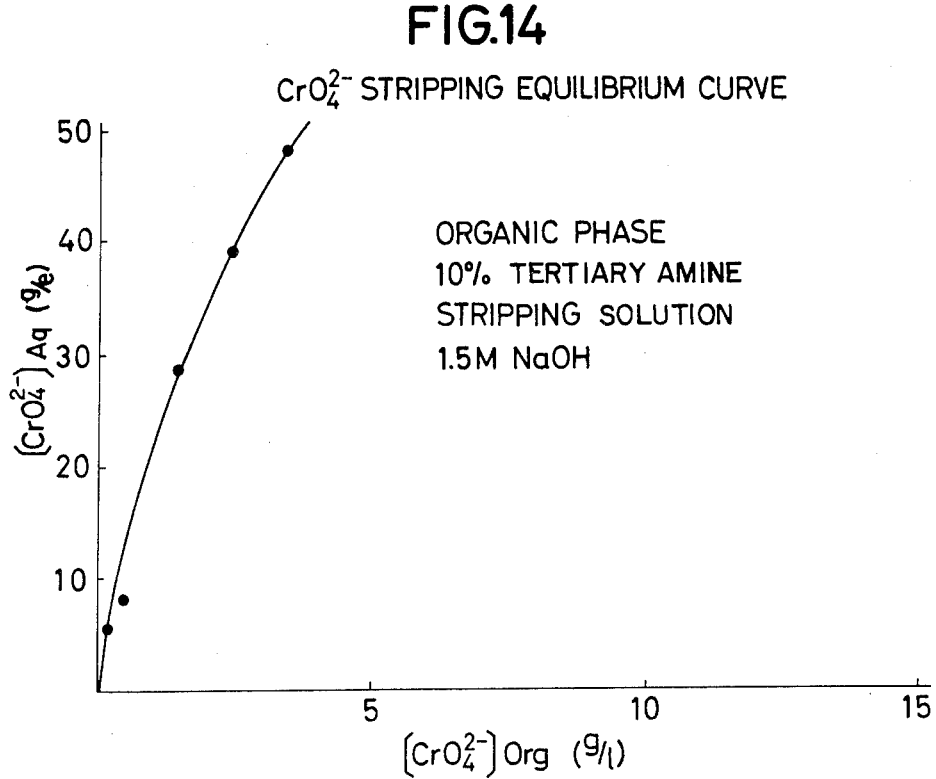

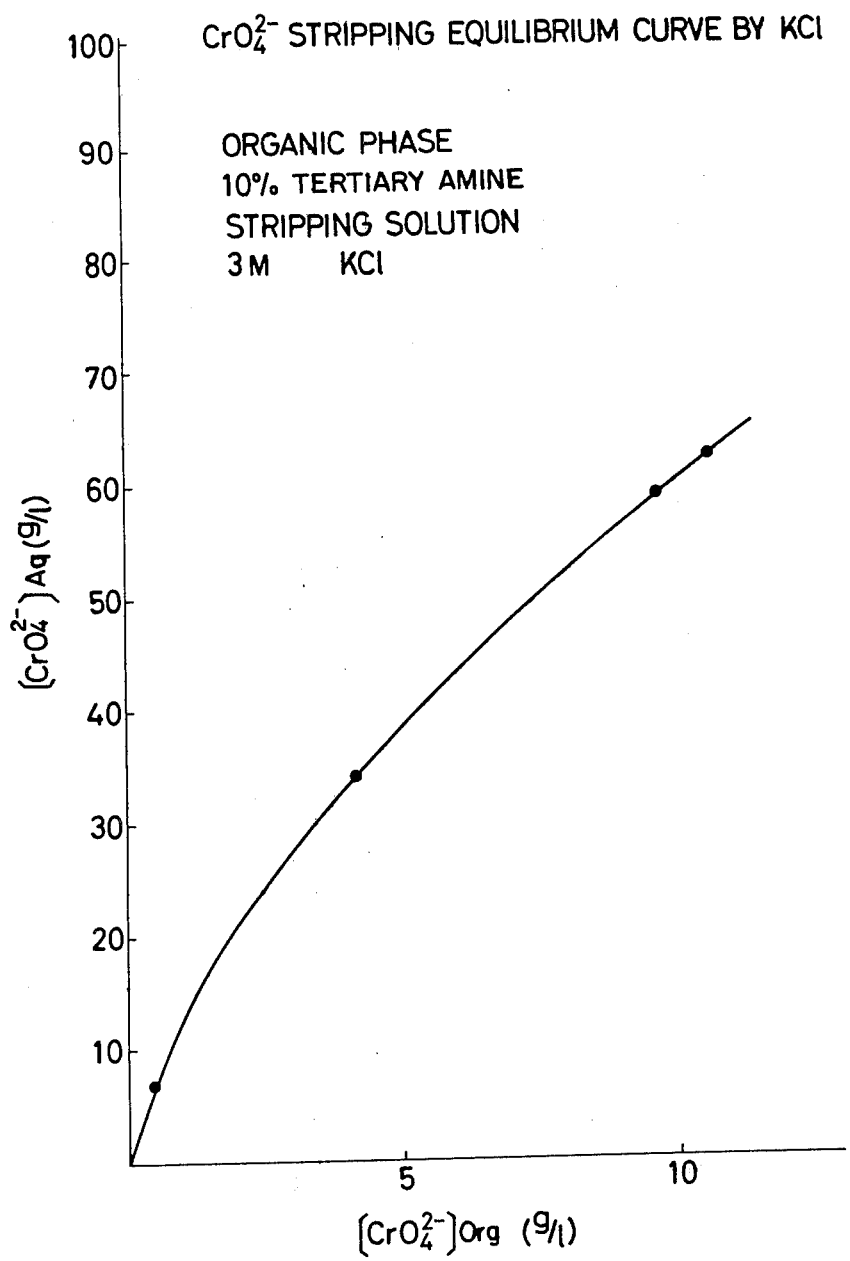

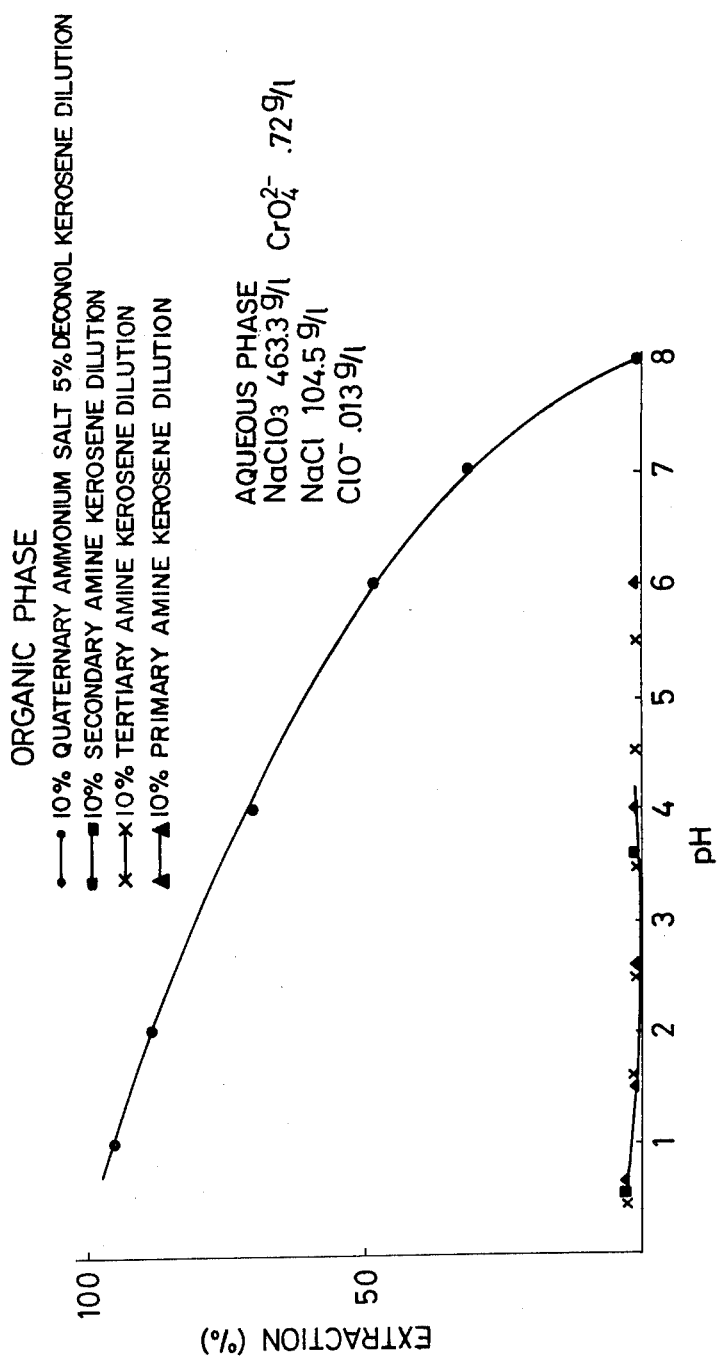

PROCESS FOR RECOVERY OF REUSABLE CHROMIC ACID FROM THE WASTE CHROMIC ACID SOLUTION CONTAINING IMPURITIES

This is a continuation of application Ser. No. 932,321 filed on Aug. 9, 1978 and now abandoned which in turn was a continuation of application Ser. No. 786,770 filed on Apr. 12, 1977, now U.S. Pat. No. 4,144,145.

BACKGROUND OF THE INVENTION

This invention relates to a method of recovering high-purity sodium bichromate, potassium bichromate and/or bichromic acid from a chromic acid solution containing impurities.

Conventional production and recovery methods of chromate comprised roasting chromium ores with NaOH, $Na_2CO_3$ or $Na_2SO_4$, leaching them with water to obtain a sodium chromate solution and crystallization of sodium bichromate by concentration after a purification process. Another conventional process comprises an addition of KCl to a sodium bichromate solution to obtain a potassium bichromate and an addition of $H_2SO_4$ to a sodium bichromate to obtain an anhydrous chromic acid. These high-purity products can be obtained owing to the content of separable substances in the production of sodium chromate in the case of a chromate solution containing a comparatively small amount of impurity. However, in case of chromium plating or chromate treatment solution containing a large amount of heavy metallic ion or $Na_2SiF_6$ and $NH_4HF$, etc., an economical disadvantage is brought on by the increase of purification cost.

An extraction method in which $CrO_4^{2-}$ ions in the aqueous solution are extracted into an organic phase as their adducts with contact of TBP (tri-butyl phosphate) or TOPO (tri-octyl phosphine oxide) and a strip method in which $H_2Cr_2O_7$ or $H_2CrO_4$ extracted into the organic phase is stripped with NaOH or $Na_2CO_3$ solution have been published, but an additional treatment is necessary due to the unfavourable problem of public pollution caused by 0.1–1.0 g/l of $CrO_4^{2-}$ ion existing in the raffinate.

Moreover, $CrO_4^{2-}$ ions have a tendency to be reduced by long residence in the organic phase and the stable operation can not be maintained owing to the formation of the third phase by $Cr(OH)_3$ yielded in a strip process with NaOH, etc. Furthermore, the solutions which are used in etching of ABS resin, etc. and contain high concentration of $CrO_4^{2-}$ ion and $H_2SO_4$ severely oxidize the above TBP or TOPO with direct contact and consequently an organic solvent, such as TBP or TOPO can not be used satisfactorily.

An extraction method in which $CrO_4^{2-}$ ions in the aqueous solution are extracted with contact of an organic solvent containing high molecular weight amines has been published but this method has the following disadvantages:

(1) enhancement of $CrO_4^{2-}$ ion extracted into the organic phase is impossible because the extreme increase of high molecular weight amine concentration is impossible in the organic phase, (2) recycle to chromium-plating or chromate treatment is impossible owing to the form recovered as $Na_2CrO_4$ by stripping with NaOH or $Na_2CO_3$ solution.

It has been published also that extraction of $CrO_4^{2-}$ ions in the chloric acid solution, for example, extraction and removal of $Na_2CrO_4$ added to protect the anode in electrolysis of NaCl solution in a production process of chlorate was tried using a primary or secondary amine to improve product-purity and to prevent the secondary public pollution, but resulted in failure. The only successful extraction and removal process of $CrO_4^{2-}$ ions in chloric acid solution using ion exchange resin is published in U.S. Pat. No. 3,980,751, but this process has also disadvantages, such as, repeated frequency of regeneration of the resin due to the small exchange capacity.

An adsorption-removal process of all cations from waste acids using cation exchange resin has been reported but the process is unfavourable due to the following disadvantages:

(1) repeated frequency of regeneration due to deficiency of exchange capacity (2) a large amount of $CrO_4^{2-}$ ions in the aqueous solution discharged by washing and regeneration processes (3) significant degradation of resin (4) problem of public pollution.

Moreover, another adsorption-removal process of $CrO_4^{2-}$ ions from waste solutions using anion exchange resin has been published but this process also has several disadvantages as follows:

(1) repeated frequency of regeneration owing to the lower exchange capacity and coadsorption of other anions coexisting with $CrO_4^{2-}$ ions, such as $SO_4^{2-}$ and $Cl^-$ ions (2) impossible to continually obtain a constant concentration of $CrO_4^{2-}$ ions in the regenerated solution, (3) large amounts of reagents required for desorption, such as NaOH, etc.

(4) large amounts of other anions mingling with $CrO_4^{2-}$ ions (5) large amounts of water required for washing (6) difficulty in formation of complete circuit of $CrO_4^{2-}$ ions because they flow off in the washing solution.

DETAILED EXPLANATION OF THE INVENTION

The present invention has overcome the disadvantages of the conventional methods described above. This invention provides a process of recovering chromic acid which is characterized by the following sequential steps and features.

1. a first step in which in the case of an aqueous solution containing more than 200 g/l of $CrO_4^{2-}$ ion, the aqueous solution is introduced into the cathode compartment of electro-dialysis process, the strip solution containing $CrO_4^{2-}$ ions from the second step is passed through the anode compartment divided with diaphragms, the $CrO_4^{2-}$ ions in the aqueous solution are transferred from the cathode compartment to the anode compartment by connecting the electrodes set in both compartments with wires and the $CrO_4^{2-}$ ion concentration in the inlet of the anode compartment is adjusted to a value below about 150 g/l for ease of the operation, 2. a second step in which $H_2SO_4$ is added in an amount which is at least equivalent to the amount of heavy metallic ions contained in the resultant solution from the first step to convert chemical species of the contained metallic ions and increase the $H^+$ ion concentration and then the $CrO_4^{2-}$ ions in the resultant aqueous solution are extracted into an organic phase with contact of an organic solvent (A) containing a phosphoric acid ester, 3. a third step in which 0.1-1.0 g/l of $CrO_4{}^{2-}$ ion remaining in the resultant aqueous solution from the second step are extracted into an organic phase with contact of an organic solvent (B) containing a primary, secondary, tertiary or quarternary amine to decrease below 0.5 ppm, 4. chromic acid ions extracted into the organic solvent (A) in the second step are recovered from the organic phase as $H_2Cr_2O_7$ or $H_2CrO_4$ solution with contact of water and the organic solvent (A) is regenerated. If necessary, 1-5 g/l of chromic acid ion remaining in the organic phase after the strip with water can be completely stripped with contact of $Na_2SO_4$, NaOH or KCl solution, 5. $Na_2CrO_4$ solution can be recovered using a sodium-containing solution, such as NaOH, $Na_2CO_3$ or $Na_2SO_4$ solution, as strip solution, 6. furthermore, $K_2Cr_2O_7$ or $K_2CrO_4$ solution can be recovered with contact of potassium-containing solution, such as, KCl or KOH solution, 7. each recovered solution is introduced into the anode compartment of electro-dialysis process in the first step and recovered in the higher concentration of chromic acid ion by acceptance of those ions transferring through the diaphragm.

8. the $CrO_4{}^{2-}$ ions extracted into the organic solvent (B) in the third step are recovered as $Na_2CrO_4$ or $K_2CrO_4$ solution from the organic phase with contact of sodium-containing or potassium-containing solution, such as NaOH, $Na_2CO_3$, KOH or KCl solution and the organic solvent (B) is regenerated.

9. the strip solution from the third step is recycled prior to the extraction process in the second step and the recovered chromic acid ions are obtained as the form of $H_2Cr_2O_7$ or $H_2CrO_4$.

10. the increase of chromic acid concentration can be obtained using the strip solution from the third step as the strip solution of the second step and the energy required for crystallization of chromate can be reduced. When the crystal of sodium bichromate or potassium bichromate is taken off, byproduct $Na_2SO_4$ or HCl can be recovered using the respective difference in solubility or boiling point in a well-known crystallization or distillation apparatus.

11. moreover, the present invention also provides a process of recovering chromic acid in the production of chlorine dioxide. As shown in FIG. 4, sodium bichromate is added to protect the anode of NaCl-electrolysis process for production of chlorine dioxide and consequently the product includes chromium or chromate ion which causes the secondary public pollution. This secondary pollution can be prevented by recycling chromic acid ions. The amount of chromate required for protecting the anode in solution chloride electrolysis is added to the aqueous solution containing NaCl and chlorate solution containing chromate is obtained by the well-known electrooxidation of the resulting aqueous solution. HCl or $H_2SO_4$ is added to the resultant solution in order to increase pH value from 7 to 1-4 favourable for evolution of chlorine dioxide gas. The $CrO_4{}^{2-}$ ions in the resultant aqueous solution are extracted into an organic phase with contact of an organic solvent (C) containing a primary, secondary, tertiary amine or a quarternary ammonium salt. The $CrO_4{}^{2-}$ ions extracted into the organic solvent (C) are stripped with contact of NaCl, NaOH, $Na_2CO_3$ or NaOH+NaCl solution prior to electrolysis and the organic solvent (C) is regenerated.

12. this invention provides also a process of recovering chromic acid used in the surface treatment of zincing iron plate as shown in FIG. 5. Zn and Fe ions included in the above chromic acid solution are extracted into an organic phase with contact of an organic solvent (D) containing a dialkyl phosphoric acid and the chromic acid can be recovered. The Zn ions extracted into the organic solvent (D) are stripped with contact of the aqueous solution containing below 50 g/l of $H_2SO_4$ or spent Zn electrolyte. Moreover, the Fe ions in the organic phase are stripped with contact of the aqueous solution containing over 100 g/l of $H_2SO_4$ or HCl and the organic solvent (D) is regenerated.

The following advantages are obtained by this invention.

(1) recovery of chromic acid, sodium bichromate or potassium bichromate in high concentration together with removal of harmful chromic ion.

(2) recovery of $NH_4HF$ and $Co(NO_3)_2$ mixed in the treatment of chromate and formation of closed-circuit of chromic acid ion.

(3) improvement of product-purity when the present invention is applied for the production of chlorate and prevention of the secondary public pollution.

(4) reduction of production cost due to the reduced amounts of used reagent through the formation of closed-circuit of $CrO_4{}^{2-}$ ion.

The present invention will now be described, though only by way of illustration, in the following Example which shows preferred aspects of the invention, by reference to the accompanying drawings, in which:

FIG. 8 is a graph showing the $H_2Cr_2O_7$ extraction equilibrium curve with TBP;

FIG. 9 is a graph showing the $H_2Cr_2O_7$, back-extraction equilibrium curve with water;

FIG. 10 is a graph showing the $H_2Cr_2O_7$, extracted with TBP, back-extraction equilibrium curve with NaOH or $Na_2SO_4$;

FIG. 11 is a graph showing the heavy metallic ions, in chromic acid solution, extraction coefficient with TBP;

FIG. 12 is a graph showing the $H_2Cr_2O_7$ extracted with TBP, back-extraction equilibrium curve with KCl;

FIG. 13 is a graph showing the $CrO_4{}^{2-}$ ion extraction equilibrium curve with tertiary amine;

FIG. 14 is a graph showing the $CrO_4{}^{2-}$ ion, extracted with tertiary amine, back-extraction equilibrium curve with NaOH;

FIG. 15 is a graph showing the $CrO_4{}^{2-}$ ion, extracted with tertiary amine, back-extraction equilibrium curve with KCl.

Figure 1:
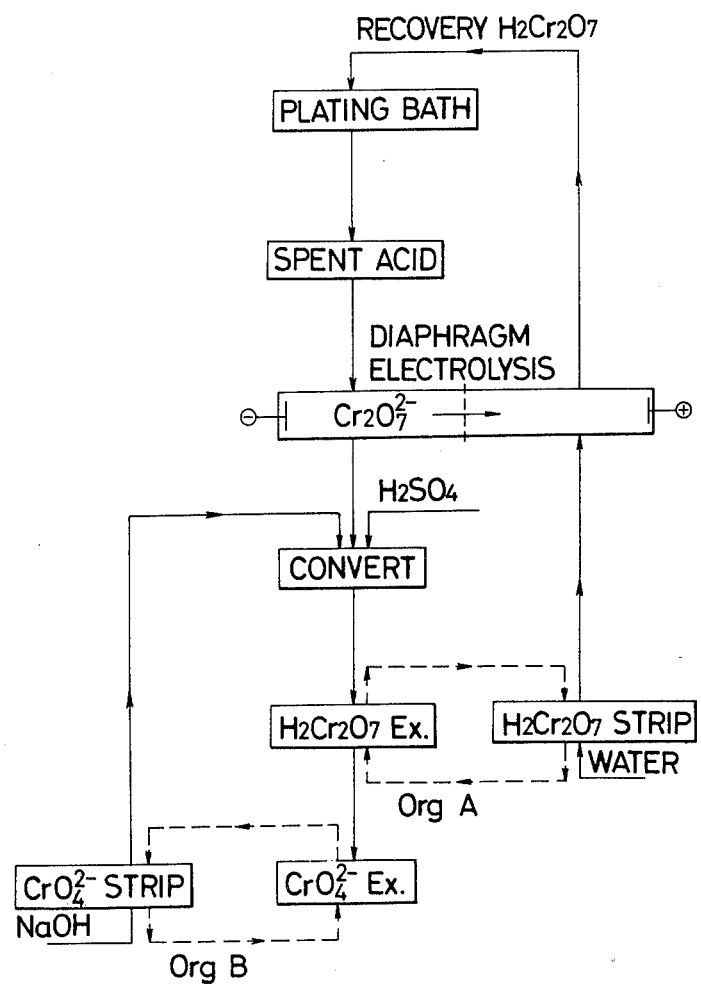
FIG. 1 shows a flowsheet of reusable bichromate recovery.
Figure 2:
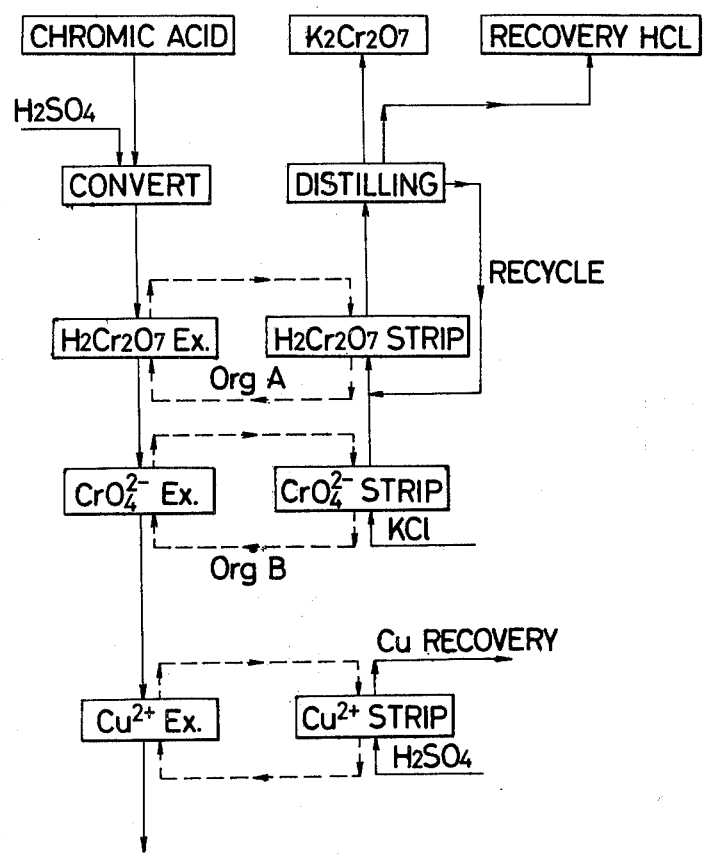
FIG. 2 shows a flowsheet of reusable $K_2Cr_2O_7$ recovery.
Figure 3:
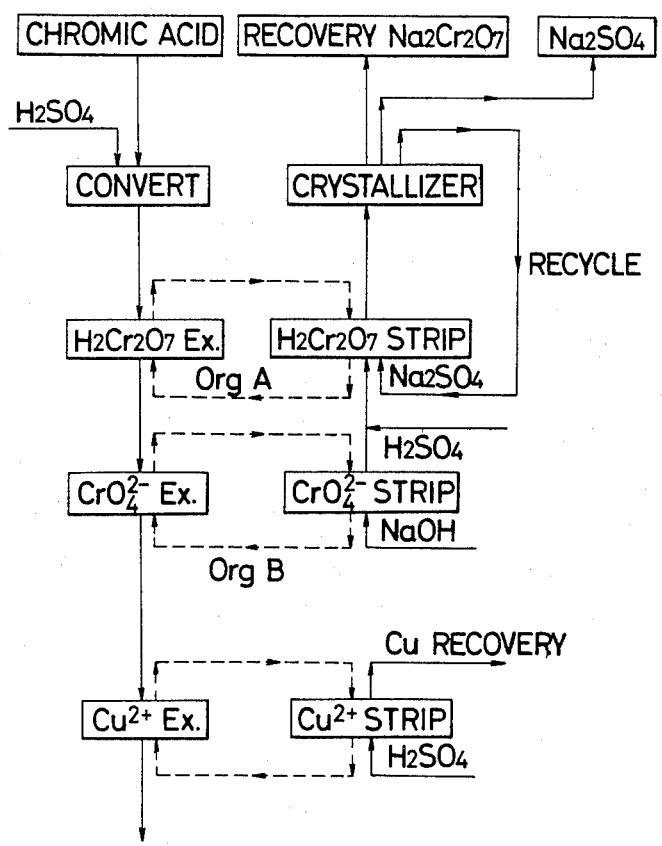
FIG. 3 shows a flowsheet of reusable $Na_2CrO_4$ recovery.
Figure 4:
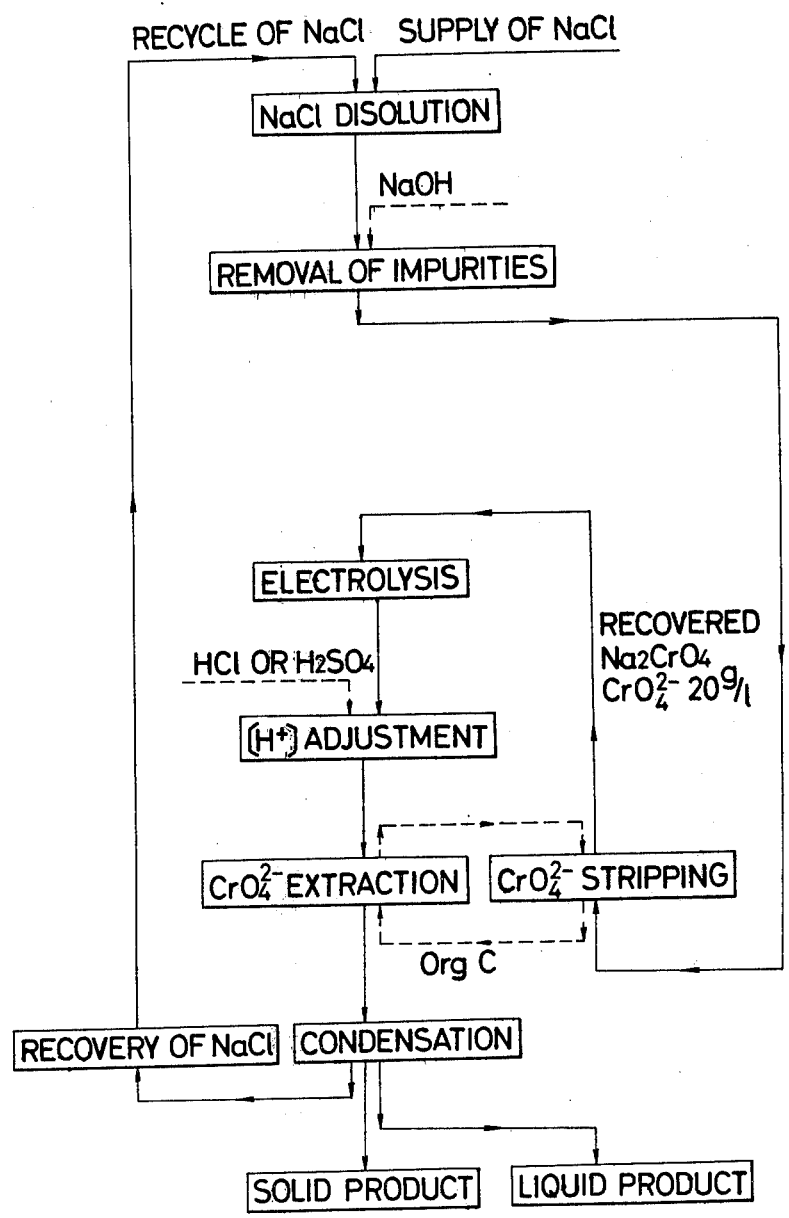
FIG. 4 shows a flowsheet of $CrO_4{}^{2-}$ ion recovery in the production of chlorate.
Figure 5:
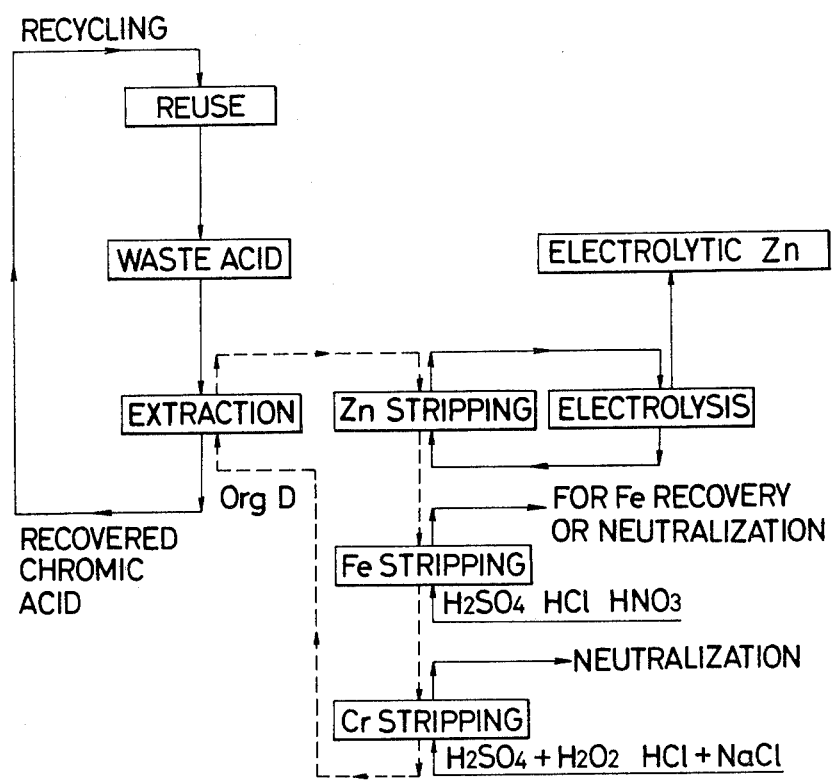
FIG. 5 shows a flowsheet of chromic acid recovery in the surface treatment of zincing iron plate.

FIG. 16 is a graph showing the relation between pH and $CrO_4^{2-}$ ion extraction coefficient with quarternary amine;

EXAMPLE 1 (see FIG. 1)

The following waste acid used for resin-etching was tested.

| $H_2Cr_2O_7$ | $Cr^{3+}$ | Fe | Ni | Cu | Total $H_2SO_4$ |
|---|---|---|---|---|---|
| 283.38 | 66.4 | 1.0 | 1.9 | 0.7 | 384.6 |
| | | (Values in g/l) | | | |

(1) The first stage-transfer of $Cr_2O_7^{2-}$ and $SO_4^{2-}$ ions by electro-dialysis.

Figure 6:
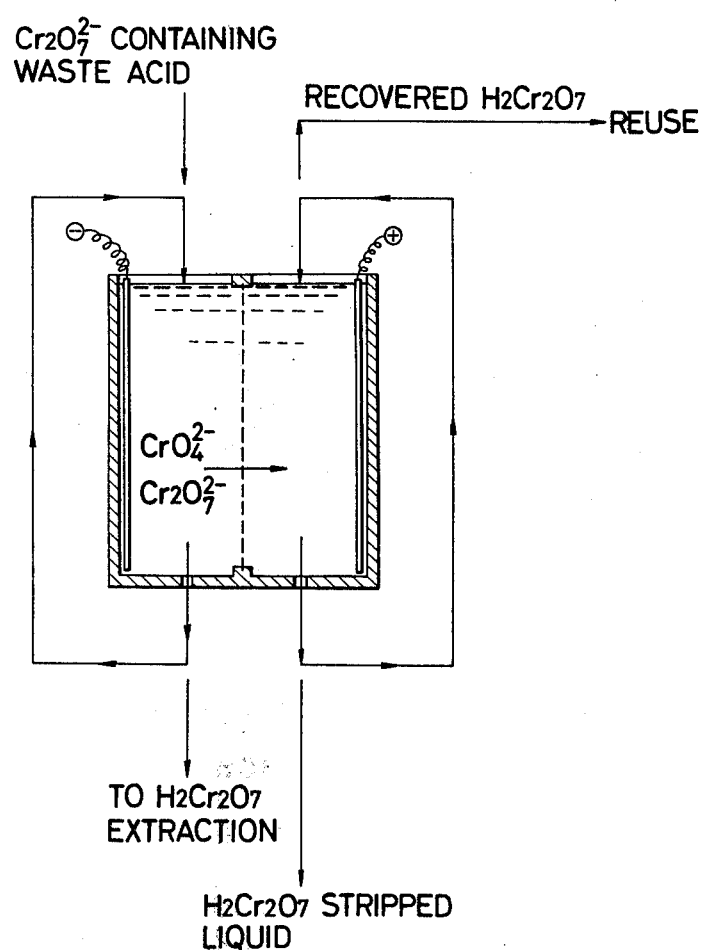
FIG. 6 is a graph showing the dialysis cell of chromic acid ion in the first step.
Figure 7:
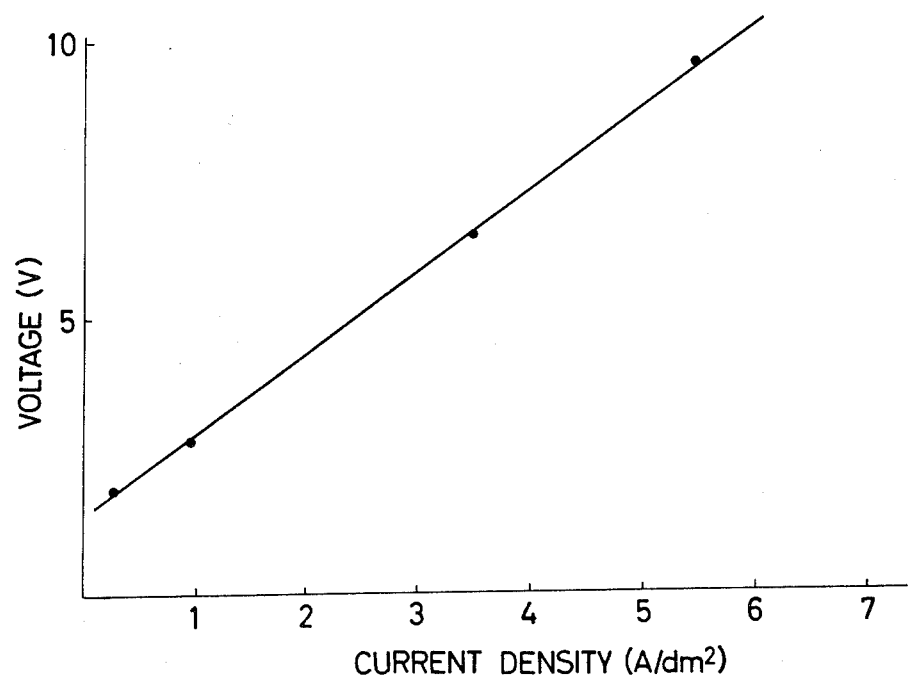
FIG. 7 is a graph showing the relation between current density in electro-dialysis cell and interelectrode voltage.

The above waste acid is fed into the cathode compartment shown in FIG. 6 and a solution containing no metallic heavy ions and a controlled concentration of chromate at 50 g/l is fed into the anode compartment and then the electrolysis process is conducted. In this case $Fe_2(CrO_4)_3$, $Fe_2(SO_4)_3$, $Cr_2(CrO_4)_3$ and $Cr_2(SO_4)_3$ salts contained in the waste acid are retained in the cathode compartment and free acid ions, such as $Cr_2O_7^{2-}$, $CrO_4^{2-}$ and $SO_4^{2-}$ ions, are transferred to the anode compartment.

The results of continuous running are shown in Table 1.

TABLE 1

| | Anode room | | Cathode room | |
|---|---|---|---|---|
| | Inlet | Outlet | Inlet | Outlet |
| $H_2Cr_2O_7$ | 50 | 198.4 | 283.38 | 151.4 |
| $H_2SO_4$ | — | 7.0 | 384.6 | 378.2 |
| $Cr^{3+}$ | — | 0.3 | 66.4 | 66.4 |
| $Fe^{3+}$ | — | <0.01 | 1.0 | 1.1 |
| Ni | — | <0.01 | 1.9 | 1.9 |
| Cu | — | <0.01 | 0.7 | 0.8 |
| | | (Values in g/l) | | |

The following diaphragms were tested besides the above one.

| Material | Electric resistance | Hole diameter | Void percent | Water permeability |
|---|---|---|---|---|
| Polypropylene | 0.12–0.27 Ω-cm² | 0.2–0.4μ | 38–45% | 0.01–0.2ml/cm²H(30cm H₂O) |
| Acetyl cellulose | 0.05–0.29 Ω-cm² | 0.1–0.43 | 38–62% | 0.11–0.4ml/cm²H(30cm H₂O) |

Anion exchange membrane (ACIPLEX-A101, tradename, produced by Asahi Kasei Co.) Transport number 0.94, percent of water content 38%.

SELEMION-AMV (tradename, produced by Asahi Glass Co.) is tested besides the above anion exchange membrane. Further, SELEMION-DMV (tradename, produced by Asahi Glass Co.) and NAFION (tradename, produced by Du-pont Co.) can be used as a dialysis membrane. Fine pore diaphragms having superior chromic acid resistance may be used besides the above one.

A net shape except plate shape can be utilized with regard to anode and cathode. Ti-Pt, lead or carbon can be used for the anode material, while lead, stainless steel, mild steel plate or materials coated with metallic oxide can be used for cathode material.

THE SECOND STAGE—EXTRACTION OF $H_2CR_2O_7$ BY ORGANIC SOLVENT (A)

$H_2SO_4$ is added in equivalent amounts to the heavy metallic ions contained in the chromic acid solution from the first stage to convert the chemical species of the contained heavy metallic ions and increase the $H^+$ ion concentration and $H_2Cr_2O_7$ in the resultant aqueous solution is extracted into an organic phase with contact of an organic solvent (A) containing a phosphoric acid ester.

TBP (tri-butyl phosphate), TOP (tri-octyl phosphate), DBBP (di-butyl butyl phosphonate) or TOPO (tri-octyl phosphine oxide) can be used as a phosphoric acid ester. Of course, a variety of similar phosphoric acid ester may be utilized and mixtures containing 30–80% of two or more than two esters together with a petroleum system-hydrocarbon as diluent may also be used.

The chemical composition of outlet solution in the first stage is shown as follows.

| $H_2Cr_2O_7$ | $Cr^{3+}$ | Fe | Ni | Cu | Total $H_2SO_4$ |
|---|---|---|---|---|---|
| 151.4 | 66.4 | 1.1 | 1.9 | 0.8 | 378.2 |
| | | (Values in g/l) | | | |

The addition of $H_2SO_4$ is not required because the above solution contains an equivalent amount of $H_2SO_4$ of heavy metallic ions contained.

The extraction mechanism of chromic acid in the aqueous solution is shown in the following expression. Chromic acid forms the adduct with an organic solvent and is extracted into an organic phase.

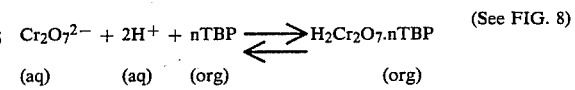
(See FIG. 8)

$$Cr_2O_7^{2-} + 2H^+ + nTBP \rightleftharpoons H_2Cr_2O_7 \cdot nTBP$$
(aq)　　(aq)　　(org)　　　　(org)

Distribution ratio of chromic acid is increased with increase of $H^+$ ion concentration in the aqueous solution or TBP or TOPO concentration in the organic phase.

Chromic acid ions extracted into the organic solvent (A) are stripped from the organic phase with contact of water and the reusable chromic acid solution can be obtained.

$$H_2Cr_2O_7 \cdot nTBP + H_2O \rightleftharpoons H_2Cr_2O_7 + H_2O + nTBP \quad \text{(See FIG. 9)}$$
$$\text{(org)} \quad \text{(aq)} \quad \text{(aq)} \quad \text{(aq)} \quad \text{(org)}$$

Recovered chromic acid solution is introduced into the anode compartment in the first stage and recycled to the reusing place after enhancement of chromic acid ion concentration by transferring those ions through the diaphragm.

0.5–5 g/l of chromic acid remain in the organic solvent (A) after strip with water and the complete strip may be done by contact of NaOH or $Na_2SO_4$ solution as follows.

$$H_2Cr_2O_7 \cdot nTBP + 4NaOH \rightleftharpoons 2Na_2CrO_4 + 3H_2O + nTBP \quad \text{(See FIG. 10)}$$
$$\text{(org)} \quad \text{(aq)} \quad \text{(aq)} \quad \text{(aq)} \quad \text{(org)}$$

The organic solvent (A) is regenerated by stripping the chromic acid remaining in the organic phase with NaOH or $Na_2SO_4$ solution and reused for the extraction process. After being recovered $Na_2CrO_4$ solution is mixed with the equivalent amount of $H_2SO_4$, it is recycled prior to the extraction process in the second stage and again recovered by the extraction with the organic solvent (A).

THE THIRD STAGE—EXTRACTION OF RESIDUAL OR SMALL AMOUNTS OF CHROMIC ACID ION

The resultant solution from the second stage contains 0.5–1.0 g/l of $CrO_4^{2-}$ ion as follows.

| $CrO_4^{2-}$ | $Cr^{3+}$ | Fe | Ni | Cu | Total $H_2SO_4$ |
|---|---|---|---|---|---|
| 0.8 | 66.4 | 1.1 | 1.9 | 0.8 | 378.2 |

The $CrO_4^{2-}$ ions contained in the above solution are extracted into an organic phase by contact of an organic solvent (B) as the following equation.

$$CrO_4^{2-} + 2(R_3NH^+) \rightleftharpoons (R_3NH^+)_2 \cdot CrO_4^{2-} \quad \text{(See FIG. 13)}$$
$$\text{(aq)} \quad \text{(org)} \quad \text{(org)}$$

Examples of amines which may be used include Primene JMT (tradename, produced by Rohm and Haas) as a primary amine, LA-1 (tradename, produced by Rohm and Haas) as a secondary amine, Alamine 336 (trademane, produced by General Mills). Alamine 308 (tradename, produced by General Mills) as a tertiary amine and Aliquat 336 (tradename, produced by General Mills) as a quarternary amine. Of course, a variety of anagolous amines may also be used.

The organic solvent (B) may be 5–30% of a primary, secondary, tertiary or quarternary amine, preferably together with 5–15% of a higher alcohol having 8–15 carbons as a modifier and a petroleum system hydrocarbon as diluent.

The $CrO_4^{2-}$ ions extracted into the organic solvent (B) are stripped from the organic phase with contact of NaOH, $Na_2CO_3$ or NaCl solution and the organic solvent (B) is regenerated as follows.

$$(R_3NH^+)_2CrO_4^{2-} + 2NaOH \rightleftharpoons Na_2CrO_4 + \quad \text{(See FIG. 14)}$$
$$\text{(org)} \quad \text{(aq)} \quad \text{(aq)}$$
$$2H_2O + 2(R_3N)$$
$$\text{(aq)} \quad \text{(org)}$$

The results of strip using various strip reagents are shown in Table 2. The used extractant consists of 10% of tertiary amine, 5% of isodecanol as a modifier and kerosene as diluent and contains 8.6 g/l of $CrO_4^{2-}$ ion by the preliminary extraction.

Strip condition Org/Aq = 5/1, Shaking time: 1 min. Temperature: 20° C.

TABLE 2

| Strip agent | $CrO_4^{2-}$ ion in the organic phase after strip | Strip efficiency % |
|---|---|---|
| 1M NaCl | 7.73 g/l | 10.3 % |
| 2M NaCl | 7.32 g/l | 15.0 % |
| 3M NaCl | 6.84 g/l | 20.4 % |
| 1M $NH_4Cl$ | 7.38 g/l | 14.3 % |
| 2M $NH_4Cl$ | 7.18 g/l | 16.7 % |
| 3M $NH_4Cl$ | 6.54 g/l | 23.9 % |
| 1M $NaNO_3$ | 6.94 g/l | 19.3 % |
| 2M $NaNO_3$ | 6.04 g/l | 29.7 % |
| 3M $NaNO_3$ | 5.13 g/l | 40.4 % |
| 1M $NaClO_3$ | 6.42 g/l | 25.4 % |
| 1M $NH_4ClO_4$ | 1.98 g/l | 77.0 % |
| 1.5M $NH_3$ | 0.36 g/l | 96.2 % |
| 1M $Na_2CO_3$ | 0.15 g/l | 98.3 % |
| 1M KOH | 0.10 g/l | 99.7 % |
| 2M KOH | 0.04 g/l | 99.9 % |

The strip solution containing NaOH and $Na_2CrO_4$ from the organic solvent (B) is reused for washing the organic solvent (A) from the second stage and recycled prior to the extraction process of the second stage. In this case it is necessary to the add the amount of $H_2SO_4$ which is equivalent to the sodium content contained in the strip solution to one which is equivalent to heavy metallic ion content contained in the waste acid. Thus, it is recycled prior to the extraction process in the second stage and recovered by the extraction with the organic solvent (A).

EXAMPLE 2 (SEE FIG. 2 AND FIG. 3)

The following waste acid used for hard chromium plating was tested as a degraded acid containing chromium acid.

| $H_2Cr_2O_7$ | $Cr^{3+}$ | Fe | Ni | Cu | Total $H_2SO_4$ |
|---|---|---|---|---|---|
| 163.9 | 3.7 | 12.6 | 0.04 | 3.4 | 5.3 |

(Values in g/l)

THE FIRST STAGE—TRANSFER OF $CRO_4^{2-}$ IONS BY ELECTRO-DIALYSIS

When the concentration of $H_2Cr_2O_7$ is below 200 g/l as shown in the above table, the first stage may be omitted owing to the small influence for the organic solvent (A) and unnecessary recovery of $SO_4^{2-}$ ions based on the low concentration of $H_2SO_4$.

THE SECOND STAGE—EXTRACTION OF H₂CR₂O₇ IN THE SOLUTION WITH THE ORGANIC SOLVENT (A)

The above waste acid is converted as shown in the following table with addition of $H_2SO_4$ required for the conversion of the contained $Cr^{3+}$, Fe, Ni and Cu ions to their sulphates.

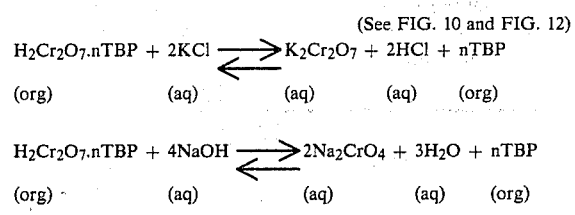

(See FIG. 10 and FIG. 12)

$$H_2Cr_2O_7 \cdot nTBP + 2KCl \rightleftharpoons K_2Cr_2O_7 + 2HCl + nTBP$$
(org) (aq) (aq) (aq) (org)

$$H_2Cr_2O_7 \cdot nTBP + 4NaOH \rightleftharpoons 2Na_2CrO_4 + 3H_2O + nTBP$$
(org) (aq) (aq) (aq) (org)

TABLE 5

Continuous strip test

| Flow ratio O/A | Inlet Org. phase H₂Cr₂O₇ | Outlet Org. phase H₂Cr₂O₇ | Inlet Aq. phase | | Outlet aq. phase | | Note |
|---|---|---|---|---|---|---|---|
| | | | KCl | Na₂SO₄ | K₂Cr₂O₇ | Na₂CrO₄ | |
| 2.5/1.0 | 74.09 | 0.4 | — | 388.4 | — | 220.4 | Strip Temp. 40° C. |
| 1.5/1.0 | 121.4 | 14.7 | 223.2 | — | 212.5 | — | Strip Temp. 52° C. |

(Values in g/l)

| H₂Cr₂O₇ | Cr³⁺ | Fe | Cu | Ni | Total H₂SO₄ |
|---|---|---|---|---|---|
| 149.0 | 5.18 | 11.45 | 3.4 | 0.04 | 118.1 |

(Values in g/l)

$H_2Cr_2O_7$ or $H_2CrO_4$ contained in the resultant solution is extracted into an organic phase with contact of an organic solvent (A) containing a phosphoric acid ester, for example, such as TBP, TOP, DBBP or TOPO. The influence of the heavy metallic ions on the extraction is shown in FIG. 11.

As shown in FIG. 11, Fe ions are partly coextracted as forms of $Fe_2(Cr_2O_7)_3$, etc. in the case of higher Fe ion concentration and consequently the coextracted Fe ions can be removed by scrubbing the organic solvent (A) with contact of chromate solution prior to the following strip process with water. The scrubbing solution is recycled prior to the extraction process in the second stage since it contains the chromic acid ions.

The mixer-settler was used for test.
Continuous extraction test

TABLE 3

| | Flow ratio O/A | Inlet Aq. phase | | | Outlet Aq. phase | | | Outlet Org. phase | |
|---|---|---|---|---|---|---|---|---|---|
| | | H₂Cr₂O₇ | H₂SO₄ | Fe | H₂Cr₂O₇ | H₂SO₄ | Fe | H₂Cr₂O₇ | Fe |
| 1 | 2.0/1.0 | 149.0 | 118.1 | 11.45 | 0.82 | 121.7 | 11.8 | 74.09 | <0.01 |
| 2 | 1.25/1.0 | 149.0 | 118.1 | 25.10 | 0.68 | 121.7 | 20.8 | 119.20 | 4.9 |

(Values in g/l)

As shown in the above table, the solution of high Fe concentration was used in Run No. 2. The Fe ions was coextracted into the organic phase with $H_2Cr_2O_7$ using the same solution as in Run No. 1 except for the Fe ion.

TABLE 4

| Flow ratio O/A | Inlet Org. phase | | Outlet Org. phase | | Inlet Aq. phase | | Outlet Aq. phase | | |
|---|---|---|---|---|---|---|---|---|---|
| | H₂Cr₂O₇ | Fe | H₂Cr₂O₇ | Fe | H₂Cr₂O₇ | Fe | H₂Cr₂O₇ | H₂SO₄ | Fe |
| 10.0/1.5 | 119.20 | 4.9 | 120.4 | <0.01 | 100.0 | 150.2 | 92.1 | 150.2 | 32.6 |

(Values in g/l)

$H_2Cr_2O_7$ or $H_2CrO_4$ extracted into the organic solvent (A) can be stripped from the organic phase with contact of the solution containing potassium, such as KCl or KOH, etc., or the solution containing sodium, such as NaOH, $Na_2CO_3$ or $Na_2SO_4$, etc.

THE THIRD STAGE—EXTRACTION OF A SMALL AMOUNTS OF CRO₄²⁻ ION WITH THE ORGANIC SOLVENT (B)

$CrO_4^{2-}$ ions contained in the resultant solution from the second stage are extracted into an organic phase with contact of an organic solvent (B) containing a primary, secondary, tertiary or quarternary amine. The organic solvent (B) comprises a primary, secondary, tertiary or quarternary amine as shown in Example 1, together with 3–15% of a higher alcohol containing 8–15 carbons as a modifier and a petroleum system-hydrocarbon as diluent.

The $CrO_4^{2-}$ ion concentration in the outlet aqueous solution of the second stage is significantly different depending on whether $Na_2SO_4$ or NaOH is used for strip of the organic solvent (A) or KCl is used.

| Run No. | CrO₄²⁻ | Fe³⁺ | Cr³⁺ | Cu²⁺ | Ni²⁺ | Total H₂SO₄ |
|---|---|---|---|---|---|---|
| 1 | 6.8 | 11.7 | 5.3 | 3.5 | 0.04 | 120.4 |
| 2 | 0.8 | 11.8 | 5.3 | 3.5 | 0.04 | 121.8 |

(Values in g/l)

The $CrO_4^{2-}$ ions contained in the above aqueous solution are almost completely extracted into the organic phase with contact of the organic solvent (B) as shown in FIG. 13. Ion concentration below 0.5 ppm can be easily obtained and discharged.

The same mixer-settler used in the second stage, 100 mm W×500 mm L×500 mm H, was used. The mixer was of the pump-suction type.

TABLE 6

Continuous extraction test

| Flow ratio O/A | Inlet Aq. phase $CrO_4^{2-}$ | $SO_4^{2-}$ | Outlet Aq. phase $CrO_4^{2-}$ | $SO_4^{2-}$ | Outlet Org. phase $CrO_4^{2-}$ | $SO_4^{2-}$ | Note |
|---|---|---|---|---|---|---|---|
| 1.0/1.0 | 6.8 | 120.4 | 0.0005 | 120.0 | 6.8 | 0.38 | 10% Alamine 336 |
| 1.0/8.0 | 0.8 | 121.8 | 0.0001 | 121.4 | 6.4 | 1.08 | 10% LA-1 |

(Value in g/l)

The $CrO_4^{2-}$ ions extracted into the organic solvent (B) are stripped from the organic phase with contact of the solution containing sodium, such as NaOH or $Na_2CO_3$, etc., or the solution containing potassium, such as KCl or KOH, etc.

(See FIG. 14 and FIG. 15)

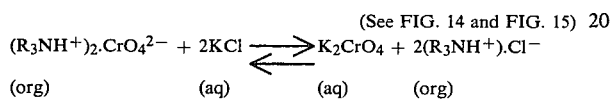

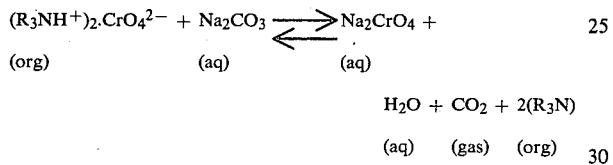

TABLE 7

Continuous strip test

| Flow ratio O/A | Inlet Org. phase $CrO_4^{2-}$ | $SO_4^{2-}$ | Outlet org. phase $CrO_4^{2-}$ | Inlet Aq. phase NaOH | KCl | Outlet Aq. phase $CrO_4^{2-}$ |
|---|---|---|---|---|---|---|
| 3.0/1.0 | 6.8 | 0.38 | <0.1 | 80 | — | 20.4 |
| 3.0/1.0 | 6.4 | 1.08 | <0.1 | — | 223.2 | 19.2 |

(values in g/l)

As shown in the above table, the strip solution used for strip of organic solvent (B), such as NaOH or $Na_2CO_3$ etc. is reused for the strip of $H_2Cr_2O_7$ extracted into the organic solvent (A) in the second stage in the situation containing $CrO_4^{2-}$ ions after the strip process. Moreover, the solution containing $CrO_4^{2-}$ ions after the strip by the solution containing potassium, such as KCl or KOH, etc., is reused for the strip of $H_2Cr_2O_7$ extracted into the organic solvent (A) in the second stage.

The solution containing potassium or sodium after the strip of $H_2Cr_2O_7$ from the organic solvent (A) in the second stage can be recovered as $Na_2SO_4$ and HCl by the well-known crystallization apparatus, as $Na_2CrO_4$ and $Na_2SO_4$ by the difference of solubility or as $K_2Cr_2O_7$ and HCl by the difference of boiling point or vapor pressure.

EXAMPLE 3 (SEE FIG. 4)

Sodium chromate is added to protect the electrodes of NaCl electrolysis process in the production of chlorate used for the production of chlorine dioxide. The well-known electrooxidation of chlorate is effected and consequently a chlorate solution containing chromic acid or chromate which has the chemical composition as shown in the following table is obtained and used for test.

| $NaClO_3$ | NaCl | $ClO_3^-$ | $CrO_4^{2-}$ | pH |
|---|---|---|---|---|
| 463.3 | 104.5 | 0.013 | 0.72 | 6.8 |

(Values in g/l)

HCl or $H_2SO_4$ is added into the resultant solution in order to adjust the pH values from below 7 to 1-4 for favourable obstruction of evolution of chlorine dioxide gas and $CrO_4^{2-}$ ions contained in the resultant acidic chlorate solution are extracted into an organic phase with contact of an organic solvent (C). The organic solvent used may be a primary, secondary, tertiary or quarternary amine but especially a quarternary amine is the most favourable one as shown in FIG. 16.

The quarternary amine used is Aliquat 336. Of course, the similar quarternary amines may also be utilized.

The $CrO_4^{2-}$ ions in the solution are extracted with the organic solvent (C) as shown in the following expression.

Figure 17:
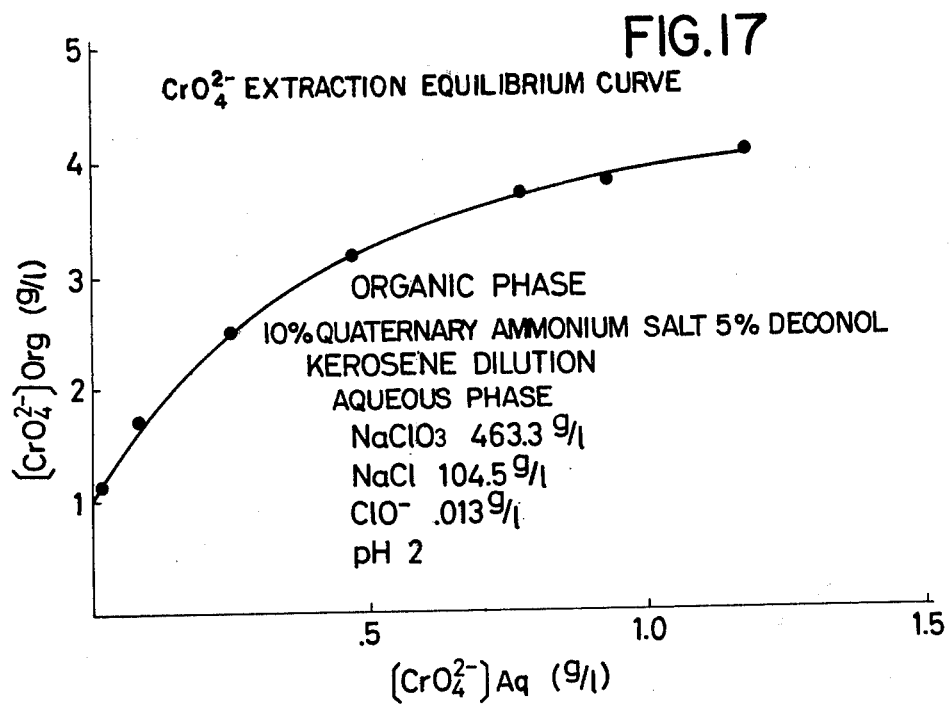
FIG. 17 is a graph showing the $CrO_4^{2-}$ ion, in chlorate solution, extraction equilibrium curve with quarternary amine.

(See FIG. 17)

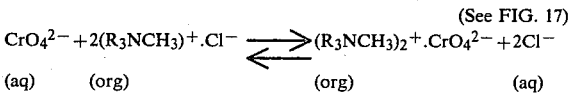

The $CrO_4^{2-}$ ions extracted into the organic solvent (C) are stripped from the organic phase by contact of NaCl or NaCl+NaOH solution, such as the solution before the electrolysis process, as shown in the following relation.

Figure 18:
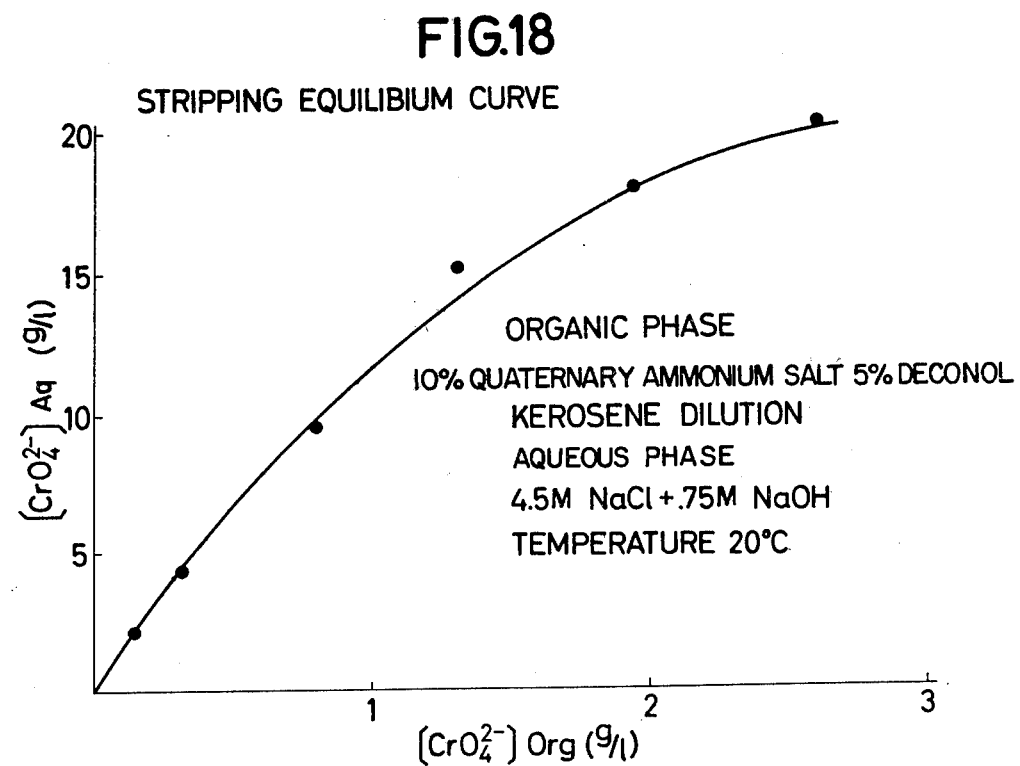
FIG. 18 is a graph showing the $CrO_4^{2-}$ ion, extracted with quarternary amine, back-extraction equilibrium curve.

(See FIG. 18)

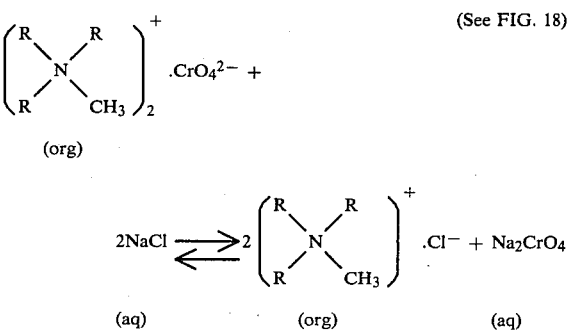

The results of other strip test are shown in Table 8. The extractant used consists of 10% of quarternary amine, together with 5% of dodecanol as a modifier and kerosene as diluent and contains 7.99 g/l of $CrO_4^{2-}$ ion by the pre-extraction.

Strip condition O/A = 5/1, Shaking time 1 min
Temperature 20° C.

TABLE 8

| Strip reagent | $CrO_4^{2-}$ in the organic phase after strip | Strip coefficiency % |
|---|---|---|
| 1.5M $NH_3$ | 7.85 g/l | 1.8% |
| 1.0M NaOH | 7.45 g/l | 6.7% |
| 1.0M $NaHCO_3$ | 6.22 g/l | 22.0% |
| 1M NaOH + 0.7M $Na_2SO_4$ | 6.16 g/l | 23.0% |
| 1.4M $Na_2SO_4$ | 5.94 g/l | 25.6% |
| 1.5M $NH_4Cl$ | 4.15 g/l | 47.8% |
| 5.6M $NH_4Cl$ | 2.43 g/l | 66.8% |
| 1.5M $NH_4Cl$ + 1.5$NH_3$ | 1.65 g/l | 79.1% |
| 1.5M $NH_4NO_3$ | 1.56 g/l | 80.5% |

EXAMPLE 4 (SEE FIG. 5)

The $CrO_4^{2-}$ ion concentration in chromic acid solution used for the surface treatment of metal is not so high as one in Examples (1) and (2) described above, generally below 100 g/l and the concentration used usually is 30–60 g/l. Moreover, $NH_4HF$, $H_3PO_4$ l and 3–20 g/l of $Co(NO_3)_2$ or $NiSO_4$ as metal salts are often added into the chromic acid solution. Therefore, the added substances besides $CrO_4^{2-}$ ion can not be recovered by the previous methods which extract only $CrO_4^{2-}$ ions. The operation control aimed at the recovery of the above substance is not only complicated but also the cost based on loss of $NiSO_4$, $CoSO_4$ and $NH_4HF$ is larger than the profit obtained for recovery of $CrO_4^{2-}$ ion.

The following degraded waste acid used for surface treatment of zincing iron plate was used for test.

| $CrO_4^{2-}$ | $Cr^{3+}$ | $Fe^{3+}$ | $Zn^{2+}$ | $Co^{2+}$ | $F^-$ | $NO_3^-$ | pH |
|---|---|---|---|---|---|---|---|
| 45.8 | 1.7 | 0.8 | 6.8 | 1.8 | 4.8 | 6.2 | 2.8 |

(Values in g/l)

The $Cr^{3+}$, $Fe^{3+}$ and $Zn^{2+}$ ions contained in the above solution are selectively extracted into an organic phase by contact of an organic solvent (D) consisting of one compound or mixed solvent of more than two compounds selected from ions or dialkyl phosphoric acid, oxime, naphtenic acid or carboxylic acid, together with 0–15% of a higher alcohol containing 8–15 carbons as a modifier and a petroleum systemhydrocarbon as diluent. The resultant aqueous solution is regenerated and reused for the surface treatment of metal.

Figure 19:
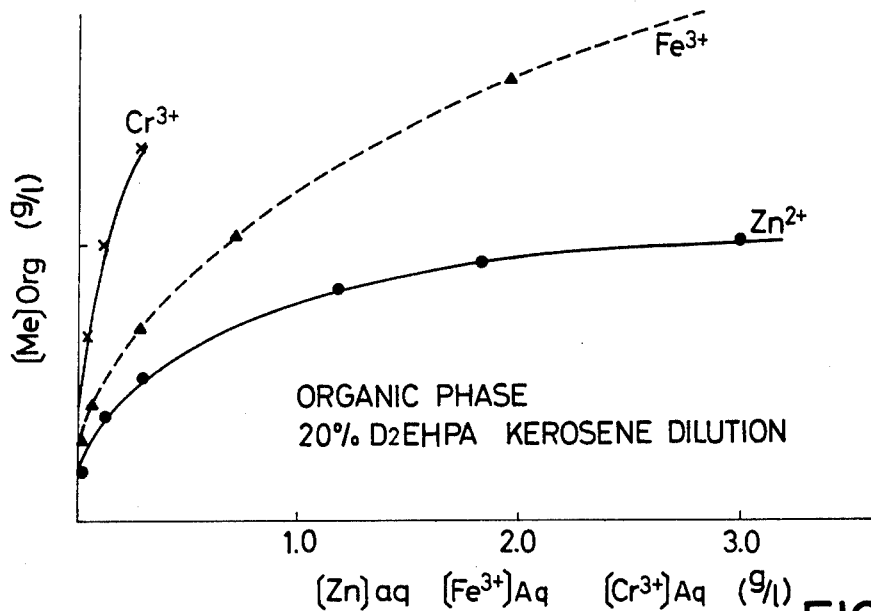
FIG. 19 is a graph showing the Zn and Fe ions, in the solution containing chromic acid and used the metallic surface treatment, extraction equilibrium curve.

The organic solvent (D) may be D2EHPA (di-ethyl hexyl phosphoric acid) or H2DDP (mono-dodecyl phosphoric acid) as alkyl phosphoric acid LIX 63 (tradename, produced by General Mills, 2-Hydroxy-5-dodecyl benzophenone oxime) as a oxime, or Versalic acid 91 (tradename, produced by Shell Chemical) or α-bromo lauric acid as a carboxylic acid. A further possibility is to employ as the organic solvent (D) a mixture of more than two above solvents. Of course, the analogous solvents may also be used. (See FIG. 19).

TABLE 9

| | Continuous extraction test | | | | | | | | | | | |
|---|---|---|---|---|---|---|---|---|---|---|---|---|
| Flow ratio | Inlet Aq. phase | | | | Outlet Aq. phase | | | | Outlet Org. phase | | |
| O/A | $Zn^{2+}$ | $Fe^{3+}$ | $Cr^{3+}$ | $Co^{2+}$ | $Zn^{2+}$ | $Fe^{3+}$ | $Cr^{3+}$ | $Co^{2+}$ | $Zn^{2+}$ | $Fe^{3+}$ | $Cr^{3+}$ |
| 2.0/1.0 | 6.8 | 0.8 | 1.7 | 1.8 | 0.14 | <0.01 | <0.01 | 1.8 | 3.38 | 0.4 | 0.85 |

(Values in g/l)

The same mixer-settler used in Example 2 was used in the continuous test. The used organic solvent (D) comprises 30% of D2EHPA and 70% of kerosene.

Figure 20:
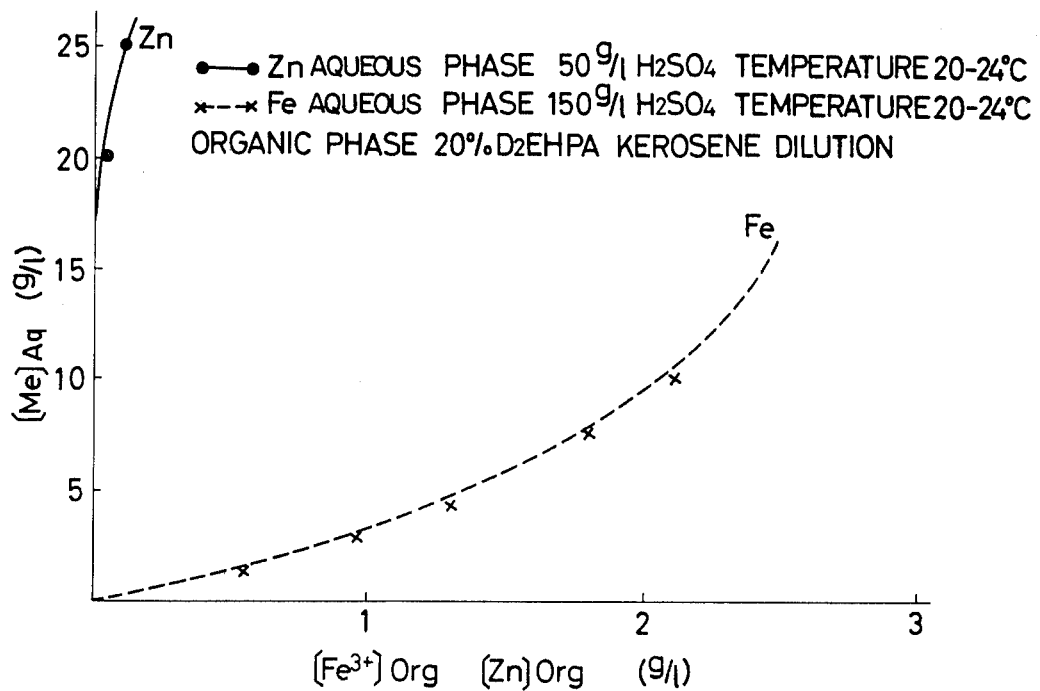
FIG. 20 is a graph showing the Zn and Fe ions, extracted with D₂EHPA, back-extraction equilibrium curve.

$Zn^{2+}$, $Fe^{3+}$ and $Cr^{3+}$ ions extracted into the organic solvent (D) is first contacted with the solution containing 50 g/l of free $H_2SO_4$ and consequently only $Zn^{2+}$ ions are stripped from the organic phase. In practical application $Zn^{2+}$ ions can be stripped by contact of spent electrolyte of Zn electrolysis and $Zn^{2+}$ ions are recovered as electrolytic zinc. (See FIG. 20).

$Fe^{3+}$ ions in the organic phase are stripped with contact of above 100 g/l of $H_2SO_4$ or HCl solution. (See FIG. 20).

$Cr^{3+}$ ions in the organic phase are stripped with contact of $H_2SO_4 + H_2O_2$, HCl + NaCl or $NH_4HF$ solution.

TABLE 10

| | Continuous strip test of $Zn^{2+}$ ion | | | | | | | | | |
|---|---|---|---|---|---|---|---|---|---|---|
| Flow ratio | Inlet Org. phase | | | Outlet Org. phase | | | Outlet Aq. phase | | | Note |
| O/A | $Zn^{2+}$ | $Fe^{3+}$ | $Cr^{3+}$ | $Zn^{2+}$ | $Fe^{3+}$ | $Cr^{3+}$ | $Zn^{2+}$ | $Fe^{3+}$ | $Cr^{3+}$ | 30% D2EHPA |
| 8.0/1.0 | 3.38 | 0.4 | 0.85 | <0.01 | 0.4 | 0.85 | 27.0 | 0.004 | <0.001 | 70% kerosene |

(Values in g/l)

TABLE 11

| | Continuous strip test of $Fe^{3+}$ ion | | | | | | | | |
|---|---|---|---|---|---|---|---|---|---|
| Flow ratio | Inlet Org. phase | | Outlet Org. phase | | Inlet Aq. phase | | Outlet Aq. phase | | Note |
| O/A | $Fe^{3+}$ | $Cr^{3+}$ | $Fe^{3+}$ | $Cr^{3+}$ | HCl | — | $Fe^{3+}$ | $Cr^{3+}$ | Temp. |
| 10/1 | 0.4 | 0.35 | <0.1 | 0.85 | 152 | — | 4.0 | <0.1 | 20° C. |

(Values in g/l)

TABLE 12

| | Continuous strip test of $Cr^{3+}$ ion | | | | |
|---|---|---|---|---|---|
| Flow ratio | Inlet Org. phase | Outlet Org. phase | Inlet Aq. phase | | Outlet Aq. phase |
| O/A | $Cr^{3+}$ | $Cr^{3+}$ | $H_2SO_4$ | $H_2O_2$ | $Cr^{3+}$ |
| 1.0/1.0 | 0.85 | 0.38 | 400 | 15 | 0.47 |

(Values in g/l)

The detailed description with regard to the recovery process of the $Fe^{3+}$ ions stripped from the HCl solution and the HCl strip solution is omitted because the present inventors have published the economical recovery process of them, such as "Improvements in or relating to the production of titanium oxide" and "A recovery process for $H_2SO_4$ or HCl containing iron ions".

What is claimed is:

1. A process for the recovery of hexavalent chromium values from an aqueous solution containing hexavalent chromium values and heavy metal ions comprising:

(a) adding H₂SO₄ to the solution in an amount at least stoichiometrically equivalent to the heavy metallic ions in the solution;

(b) extracting the hexavalent chromium values from the aqueous acidified solution by liquid-liquid extraction using an organic extractant (A) consisting essentially of one or more compounds selected from the group consisting of phosphoric acid esters together with a petroleum hydrocarbon as a diluent to produce an organic phase containing hexavalent chromium values and an aqueous raffinate;

(c) bringing the organic phase containing hexavalent chromium values into contact with water which is free from sodium, potassium, and ammonium to regenerate the organic extractant (A);

(d) extracting any remaining hexavalent chromium in said aqueous raffinate by liquid-liquid extraction with an organic extractant (B) consisting essentially of one or more compounds selected from the group consisting of primary, secondary, tertiary and quaternary amines together with a petroleum hydrocarbon as a diluent; and (e) bringing the organic phase containing hexavalent chromium values into contact with a solution containing Na, K or NH₄ ion to regenerate the organic extractant (B) and recirculating the organic extractant (B) into step (a).

2. The process of claim 1 wherein extractant (A) is stripped with a reagent selected from the group consisting of water, an aqueous sodium salt solution and an aqueous potassium salt solution.

3. The process of claim 1 wherein organic extractant (A) is scrubbed with a mixture of chromic acid and sulfuric acid to extract iron ions therein.

4. The process of claim 1 wherein organic extractant (A) is stripped with water and the stripped organic extractant (A) is then washed with a solution of Na₂SO₄, Na₂CO₃ or NaOH to extract any remaining hexavalent chromium values therefrom.

5. The process of claim 1 wherein organic extractant (B) is stripped with an aqueous solution of a sodium salt, H₂SO₄ is added to the resulting strip solution in an amount at least stoichiometrically equivalent to the amount of sodium therein and the acidified strip solution is then extracted with organic extractant (A).

6. The process of claim 1 wherein the stripping solution used to strip organic extractant (B) is then used to strip organic extractant (A).

7. A process for the recovery of hexavalent chromium values from an aqueous solution containing hexavalent chromium values and other metallic ions comprising:

(a) adding H₂SO₄ or HCL to the aqueous solution in an amount at least stoichiometrically equivalent to the other metallic ions in the aqueous solution to convert the chemical species of the above other metallic ions in the aqueous solution;

(b) extracting most of the hexavalent chromium values from the said aqueous solution by liquid-liquid extraction using an organic extractant (A) composed of one or more compounds selected from the group consisting of phosphoric acid esters together with a petroleum hydrocarbon as a diluent to produce an organic phase containing hexavalent chromium values and an aqueous raffinate;

(c) bringing the organic phase into contact with water to recover the hexavalent chromium values and regenerate the organic extractant (A);

(d) extracting any remaining hexavalent chromium values in the aqueous raffinate by liquid-liquid extraction with an organic extractant (B) composed of one or more compounds selected from the group consisting of primary, secondary, tertiary and quaternary amines together with a petroleum hydrocarbon as a diluent to produce an organic phase containing hexavalent chromium values and an aqueous raffinate;

(e) bringing the organic phase into contact with an aqueous solution containing Na, K or NH₄⁺ to strip the hexavalent chromium values and regenerate the organic solvent (B); and (f) circulating the strip solution after step (e) to step (a).

8. A process for the recovery of hexavalent chromium values from an aqueous solution containing hexavalent chromium values and other metallic ions comprising:

(a) extracting the hexavalent chromium values from the aqueous solution by liquid-liquid extraction with an organic extractant (B) composed of one or more compounds selected from the group consisting of primary, secondary, tertiary and quaternary amines together with a petroleum hydrocarbon as a diluent to produce an organic phase containing hexavalent chromium values and an aqueous raffinate;

(b) bringing the organic phase into contact with a NA—, K—, or NH₄⁺-containing solution to strip the hexavalent chromium values and regenerate the organic extractant (B);

(c) adding H₂SO₄ or HCl to the used aqueous strip solution after step (b) in an amount at least stoichiometrically equivalent to the metal ions other than the hexavalent chromium values in the aqueous solution;

(d) extracting most of the hexavalent chromium values from the acidified strip solution after step (c) by liquid-liquid extraction with an organic extractant (A) composed of one or more compounds selected from the group consisting of phosphoric acid esters together with a petroleum hydrocarbon as a diluent to produce an organic phase containing hexavalent chromium values;

(e) bringing the organic phase into contact with water to recover the hexavalent chromium values and regenerate the organic extractant (A); and (f) circulating the solution from step (e) to step (a).

9. The process of claims 7, or 8 wherein after stripping most of the hexavalent chromium values extracted into organic extractant (A) with water, any hexavalent chromium values or substances unstrippable with water in said organic extractant are completely stripped therefrom by bringing the organic extractant into contact with a sodium containing solution.

10. A process for the recovery of hexavalent chromium values from an aqueous solution containing hexavalent chromium values and heavy metal ions comprising:

(a) extracting the hexavalent chromium values from the solution by liquid-liquid extraction with an organic extractant (B) consisting essentially of one or more compounds selected from the group consisting of primary, secondary, tertiary and quaternary amines together with a petroleum hydrocarbon as a diluent to produce an organic phase containing hexavalent chromium values and an aqueous raffinate;
(b) bringing the organic phase containing hexavalent chromium values into contact with a solution containing Na, K or NH$_4$ ion to regenerate the organic extractant (B) and recirculating the organic extractant (B) into step (a);
(c) adding an acid selected from the group consisting of H$_2$SO$_4$ and HCl to the used aqueous strip solution of step (b) in an amount at least stoichiometrically equivalent to the amount of sodium, potassium or ammonium ions therein;
(d) extracting the hexavalent chromium values from the acidified stripping solution, of step (c) by liquid-liquid extraction with the organic extractant (A) consisting essentially of one or more compounds selected from the group consisting of phosphoric acid esters together with a petroleum hydrocarbon as a diluent; and
(e) bringing the organic phase containing hexavalent chromium values into contact with water to regenerate the organic extractant (A).

* * * * *